July 24, 1956  H. G. WARREN  2,756,108
SHOWER HEAD
Filed Feb. 23, 1954

INVENTOR.
HARRY GLENN WARREN
BY
J. Gordon Argus
ATTORNEY.

United States Patent Office 2,756,108
Patented July 24, 1956

2,756,108

SHOWER HEAD

Harry Glenn Warren, Glendora, Calif., assignor, by mesne assignments, to Nylon-Maid, Inc., a corporation of California Application February 23, 1954, Serial No. 411,702

13 Claims. (Cl. 299—152)

This invention relates to shower heads, and has for an object the provision of a shower head of simple construction which incorporates water shut-off means. An optional object is to provide such a shower head which may advantageously be cast from plastic materials.

The invention is carried out in a shower head having a body mounted to a supply member which supply member may, if desired, be tubular with a ball on one end to form one part of a ball joint. The tubular member has a central axis, and the body is mounted so as to be rotatable with respect to said axis.

A feature of the invention resides in providing spaced passages in a valve member which may, if desired, be the ball itself. These passages are spaced around the central axis of the supply member, and do not rotate around that axis. The body is provided with conduit means for passing water from the supply member and discharging it from the body. These conduit means are so spaced relative to the valve member that rotation of the body causes the passages and conduit means to pass alternately in and out of registration with each other, thereby alternately turning the water on and off.

An optional feature resides in the provision of a substantially cylindrical cavity in the body, having tapered slots in its inner wall, said slots becoming deeper toward the edge of the body. A circular spreader plate with a radius substantially equal to that of the cavity is shiftable along the tapered slots, whereby the spreader plate varies the size of the openings between the spreader plate and the body. The conduit means interconnect with the cavity, and the spreader plate thus determines the size of the shower jets.

A further optional feature resides in making the shower head of a plastic material which has a lower coefficient of friction when pressed against a piece of similar material, than the coefficient of friction between metals commonly used in shower heads.

The above and other features of the invention will be fully understood from the following detailed description and the accompanying drawings, of which:

Figure 1:
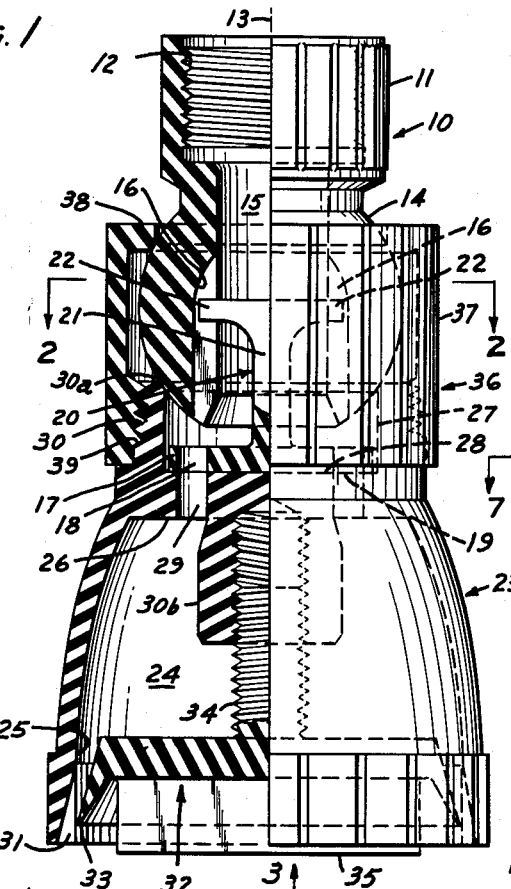
Fig. 1 is an elevation, partly in cross-section, of a shower head according to the invention.
Figure 3:
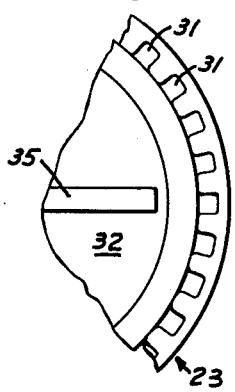
Fig. 3 is a partial end view taken at line 3—3 of Fig. 1.

Fig. 1 shows a shower head having a supply member 10 with a tubular end portion 11. Internal threads 12 are formed in the tubular end portion so that the supply member can be screwed onto a water pipe (not shown). When so attached, the supply member is held against further rotation about its central axis 13. This supply member has a ball 14 on the outside of the end away from the threads, and a central bore 15 passes axially through the supply member from end to end. At the ball end, two axially extending, diametrically opposite channels 16 are formed in the inner wall of the central bore 15. The ball 14 forms one part of a ball joint.

A valve disc 17 has three circumferential passages 18 passing axially therethrough and a flat lower surface 19. A crosshead 20 comprising a post 21 and two diametrically opposed arms 22 rises from the upper part of the disc. The cross-head is integral with the disc.

A body 23 has a cavity 24 with a cylindrical wall 25 near one end. A barrier 26 extends across the body near the top thereof. A countersunk bore 27 has a flat surface 28 at its bottom to match the surface 19 of the valve disc. Three conduits 29, which preferably have the same circumferential spacing as the passages in the disc lead from the surface 28 to the cavity. The upper part of the body has external threads 30, and an internal chamfer 30a for a ball seat. An internally threaded sleeve 30b depends into the cavity from the center of the barrier 27.

Tapered slots 31 having their bottoms deeper near the edge of the body than near the barrier are formed in the cylindrical wall 25. A circular spreader plate 32 with a flexible feathered edge 33, a threaded stud 34, and a grip 35, is attached to the body by screwing the stud into the sleeve 30b so that the plate is disposed within the cylindrical wall. The feathered edge bears against the cylindrical wall 25.

The shower head is assembled and held together by means of a sleeve nut 36 which has a tubular portion 37 and an internally projecting shoulder 38. Internal threads 39 are provided to engage threads 30 on the body. The tubular portion 11 of the supply member is smaller than the shoulder 38 so as to pass therethrough, while the ball 14 has a larger diameter than the shoulder. To assemble the shower head, the valve disc is placed against the surface 28 with the arms 22 in the channels 16. The sleeve nut is placed over the supply member, and then tightened down on the body. This presses the shoulder 38 against the ball, and the ball against the chamfer 30a. The ball 14, upper end of the body 23, and nut 36 complete a ball joint, and the body can therefore swivel and rotate (twist) about the ball. The outside of the sleeve nut and the body may be serrated as shown, if desired, to provide a better grip for a wet hand.

Figure 4:
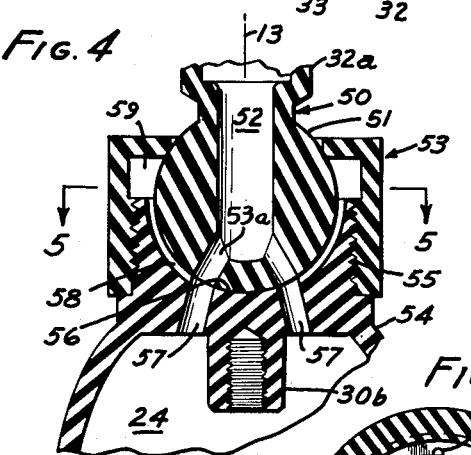
Fig. 4 is a cross-section of another form of shower head according to the invention.
Figure 5:
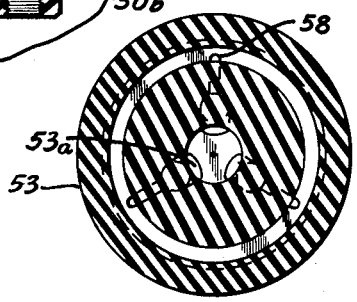
Fig. 5 is a cross-section taken at line 5—5 of Fig. 4.

Figs. 4 and 5 show an alternate form of the shower head in which the shut-off means are partly integral with the supply member, instead of being flexibly attached thereto. In this embodiment, the supply member 50 has a ball 51 on one end. A bore 52 passes from the tubular end 32a of the supply member partway into the ball, but does not go axially all the way through it. Three passages 53a are circumferentially disposed around the ball so as to be side-tapped into the bore 52.

By means of a sleeve nut 53 which is the same as sleeve nut 36, the supply member is held against a body 54. Body 54 has a lower end which is exactly like that of Fig. 1, and that end is therefore not shown in Fig. 4. However, the upper end of this body has a generally cylindrical outer portion with external threads 55 thereon. The inside of this upper end has a substantially hemispherical ball seat 56. Three conduits 57, spaced similarly to the passages in the ball, pass through the body from the seat to the cavity 24. The ball seat 56 is scooped out to form bleed channels 58 leading to the top of the body.

Figure 6:
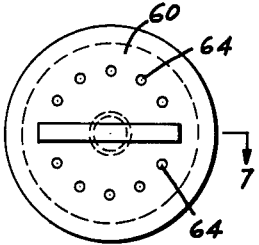
Fig. 6 is a plan view of an alternate form of spreader plate for use in the shower heads of Figs. 1 and 4.
Figure 7:
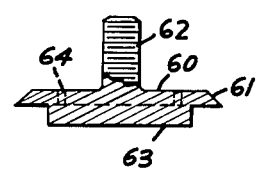
Fig. 7 is a cross-section taken at line 7—7 of Fig. 6.

Figs. 6 and 7 show an alternate form of the spreader plate which may be used in the shower heads of Figs. 1 and 4 in place of the spreader plate 32. This spreader plate has a disc 60 with a beveled outer edge 61, a central stud 62 on the beveled side, and a grip 63 rising from the side opposite the stud. If desired, holes 64 may pass through the disc near the center thereof to provide additional jets of water near the center of the shower head.

Figure 2:
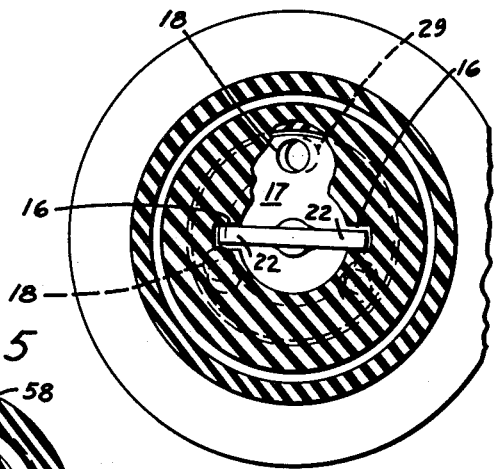
Fig. 2 is a cross-section taken at line 2—2 of Fig. 1.

The use of the shower head is extremely simple. The head of Fig. 1 may be turned off so as to stop all water flow by rotating the body relative to the supply member, until the conduits 29 in the body do not register with any passages 18 in the valve disc. It will be appreciated that the passages and conduits are always off-center with respect to the central axis of the supply member. To open the shower head, the body is simply rotated further, until the conduits and the passages register with each other. It will be appreciated that an intermediate volume of flow may be achieved by turning the body so that the conduits and passages are in partial registration. Such a condition is shown in Fig. 2. When the conduits and passages are in at least partial registration, there will be a continuous fluid conduit from the water pipe through the supply member, past the valve means, through the conduits, to the cavity 24.

When the water fills the cavity 24, it will escape through the tapered slots 31. To vary the size of the jets, the spreader plate is turned by the grip 35 to move the disc axially in or out in the cylindrical portion of the body. As the plate moves inwardly toward the shallower end of the slots, it progressively cuts down the cross-sectional area of the individual jets as bounded by the body, the sides of the slots, and the spreader plate. If the spreader plate is screwed in all the way, it will stand above the slots entirely, and prevent any flow of water through them, thereby shutting off the water. To obtain the coarsest spray, the spreader plate is simply unscrewed until it stands opposite the deepest end of the slot near the edge of the body. The feathered edge 33 of the spreader plate in Fig. 1 makes a firm contact with the cylindrical surface, and this contact minimizes leakage between the spreader plate and the body between the slots.

It will be appreciated that the valve disc and body are universally mounted to the supply member. The valve disc can swing with respect to the central axis of the supply member, but cannot rotate around it, and the passages are therefore fixed relative to rotation around the central axis of the supply member when the body and supply member are aligned. The arms 22 are free to slide up and down the channels 16, but are constrained against movement around the axis, while the post 21 is free to move, except that it cannot rotate. Rotation of the body and its conduit means, is used throughout this specification in the sense of "twisting," and is understood to mean rotation of the body around its own axis. It will be understood that, when the body and the supply member are in alignment, the conduits and passages are all circumferentially disposed around the common central axis of the supply member and the body. The passages in the valve disc cannot be rotated around the central axis of the supply member, because the cross arm keeps the valve disc from rotating at all. The cross arm and disc can only swing. It is evident that this swinging movement could potentially move any conduit or passage to a position on any side of the central axis, but this is not effective in changing the relative positions of the conduits and passages to vary the flow of water. Therefore the body remains properly aligned with the valving means regardless of its angular position relative to the supply member.

The sleeve nut provides a firm seal which dispenses with the gaskets and seals commonly required in shower heads. By clamping the shoulder against the ball, and the ball against the chamfer 30a, two effective seals are made. In addition, water pressure within the head acts to force the ball upward against the shoulder 38, thereby making an even tighter seal at that point.

The shower head of Fig. 4 is assembled by placing the ball in the hemispherical ball seat, and then screwing the sleeve nut onto the body. This causes the shoulder of the sleeve nut to bear against the ball and hold it against the seat, thereby completing a ball joint between the supply member and the body. In this embodiment water pressure between the seat and the ball is exerted against a maximum area of the body, and, depending on the nature of the material of which the shower head is made, the force tending to push the body and supply member apart may be greater than the shoulder can withstand. Therefore the bleed channels 58 are provided which bleed pressure to the region 59 between the shoulder and the body. The pressure in this region will partly counterbalance the pressure which tends to unseat the body.

This shower head is also universally mounted, and is free to swing back and forth, and to rotate around the central axis of the supply member. The conduits 53a are "dished" out slightly at the hemispherical seat so that, even when the head is swung, the passages and conduits can pass in and out of registration. Fig. 5 shows the conduits and passages in registration whereby water may flow through the shower head. To turn off the water, the head need only be rotated or swung until they are no longer in registration with each other. The shower head of Fig. 4 may be provided with a spreader plate such as is shown in Fig. 1.

The spreader plate of Figs. 6 and 7 may be used in either of the shower head embodiments. It is used in the same manner as spreader plate 32. The grip 63 is turned so as to move the disc in or out of the cylindrical portion of the body. The edge of the disc closely abuts the inner cylindrical wall, and as it moves in and out causes the effective cross section of the slots to decrease or increase respectively. If the central holes 64 are provided, water can pass through these additional jets.

The shower heads shown have many unique advantages, one being their usefulness in connection with plastic materials, particularly nylon. Due to the relatively high coefficient of friction between metals commonly used for shower heads, a device incorporating simple shut off means according to this invention has not been practicable. The high pressures of the water has created forces too large to permit a body such as member 23 to be conveniently turned by hand. It has been found that the coefficient of friction between the nylon surfaces is only .031, as compared with .438 between nylon and brass, and a much larger value between brass and brass. This lower coefficient of friction results in a shower head which can be easily turned by hand. Therefore this shower head is preferably made of some plastic material, preferably nylon, which has a relatively low coefficient of friction as compared to common metal to metal coefficients.

An additional advantage of this shower head is that it may conveniently be injection molded, thus significantly reducing the cost of manufacture, and improving the dimensional accuracy of the articles produced.

The non-metallic material which can be used in this shower head acts as an insulator, both for heat and for electricity, reducing the hazard of shocks, and also keeping the shower head comfortable to the touch.

This unique shower head makes any shower outlet a mixing outlet, since the valve means in the shower head may be turned off, the water supply then adjusted to any desired temperature, and the water turned on by twisting the body.

While the shower heads have been shown with sets of three conduits and three passages for rotary valving means, it will be appreciated that more or fewer could be used. This invention is not to be limited by the embodiments shown in the drawings and described in the description, but only in accordance with the appended claims.

I claim:

1. A shower head comprising in combination: a supply member having a central axis, a ball on one end thereof, and a bore through the member; a body having conduit means spaced around said central axis when the body and supply member are aligned; a sleeve nut surrounding the ball and affixed to the body whereby the body is rotatably mounted with respect to the supply member; and valve means having passages spaced around and fixed with respect to rotation around the central axis of the supply member, said body and valve means being disposed adjacent to each other whereby rotation of the body with respect to the supply member causes the conduit means and passages to alternately pass in and out of registration with each other, thereby alternately allowing and preventing the flow of water through the shower head.

2. A shower head according to claim 1 in which the bore passes axially through the supply member and in which the bore has two opposed, axially extending channels in its inner wall at the end near the body, and a disc valve member comprising a disc with circumferentially spaced passages therethrough, a cross-head member attached to the valve disc, and arms on said cross-head member which are restrained in the channels.

3. A shower head according to claim 2 in which the parts are made of nylon.

4. A shower head according to claim 2 in which the body has an internal cavity with a cylindrical portion therein, and also has tapered slots in the wall of the cavity extending in an axial direction, and a spreader plate axially movable in said chamber for creating orifices of variable size in said tapered slots.

5. A shower head according to claim 4 in which the spreader plate has a flexible feathered edge for making contact with the inner wall of the cavity.

6. A shower head according to claim 4 in which the spreader plate has a beveled edge.

7. A shower head comprising in combination: a supply member having a central axis, a tubular portion at one end, a ball on the other end, a bore through the supply member and two opposed axially extending channels in the bore; a body having a cavity, and also conduit means which are spaced around said central axis when the body and supply member are aligned; a sleeve nut having a tubular portion, an inwardly projecting shoulder on said sleeve nut, and threads in said tubular portion adapted to be threaded onto threads on the body to enclose the ball and form a ball joint; a valve disc between the supply member and the body having circumferentially spaced passages therethrough, a cross-head attached to said valve disc comprising a post with two oppositely directed arms adapted to fit in the channels in the bore; said valve disc being adjacent to the body and the conduit means whereby rotation of the body with respect to the supply member causes the conduit means and passages to alternately pass in and out of registration with each other, thereby alternately allowing and preventing the flow of water through the shower head; the cavity having a cylindrical portion therein which has tapered slots in the wall thereof which extend in an axial direction, and a spreader plate axially movable in said chamber for creating orifices of variable size in said tapered slots.

8. A shower head comprising in combination: a supply member having a central axis, a tubular portion at one end, a ball for a ball joint on the other end, a bore through the tubular portion of the supply member, and a passage through the ball to the bore; the intersection of the passage and the surface of the ball being spaced from the central axis of the supply member, a body, a ball seat in said body, said body having a cavity, and conduit means which are spaced around said central axis when the body and supply member are aligned, which conduit means interconnect the cavity with said ball seat in the body; a sleeve nut having a tubular portion, an inwardly projecting shoulder on the sleeve nut, and threads in said tubular portion adapted to be threaded onto threads on the body and to hold the ball on the ball seat, and to leave a space between the sleeve nut and the body; whereby the conduit means are adjacent to the ball, and rotation of the body with respect to the supply member causes the conduit means and passage to alternately pass in and out of registration with each other, thereby alternately allowing and preventing the flow of water through the shower head; the cavity having an inner cylindrical portion which has tapered slots in the wall thereof which extend in an axial direction, and a spreader plate axially movable in said chamber for creating orifices of variable size in said tapered slots.

9. A shower head according to claim 8 in which the ball seat is provided with channels leading to the space between the sleeve nut and the body.

10. A shower head according to claim 9 in which the parts are made of nylon.

11. In a shower head, the combination comprising a supply member having a central axis, a bore therein, and a ball thereon, a body mounted to the ball on the supply member so as to be rotatable with respect to said central axis and having conduit means therethrough which are spaced around the central axis of the supply member when the body is aligned with the supply member, valve means comprising a valve disc pivotally mounted to the supply member, said valve disc having passages therethrough which are spaced around the central axis of the supply member when the body is aligned with the supply member, said valve disc being fixed with respect to rotation about said central axis, the body and valve means abutting against each other whereby rotation of the body with respect to the supply member causes the conduit means and passages to alternately pass in and out of registration with each other, thereby alternately allowing and preventing the flow of water through the shower head.

12. A shower head according to claim 11 in which the valve disc bears against a matching surface in the body, and in which a cross-head is affixed to the valve disc and serves to pivotally mount the valve disc to the supply member.

13. In a shower head, the combination comprising a supply member having a central axis, a bore therein, a ball thereon, and passages through the ball to the bore, the intersection of the passages and the surface of the ball being spaced from the central axis of the supply member and being circumferentially spaced thereon, a body mounted to the ball on the supply member so as to be rotatable with respect to said central axis and having conduit means therethrough which are spaced around the central axis of the supply member when the body is aligned with the supply member, the body and passages being disposed adjacent to each other, whereby rotation of the body with respect to the supply member causes the passages and conduit means to alternately pass in and out of registration with each other, thereby alternately allowing and preventing the flow of water through the shower head.

References Cited in the file of this patent

UNITED STATES PATENTS

| | | |
|---|---|---|
| 1,241,765 | Pritchett | Oct. 2, 1917 |
| 2,658,799 | Fraser | Nov. 10, 1953 |